United States Patent [19]

Miller et al.

[11] 4,134,107

[45] Jan. 9, 1979

[54] REPLACEMENT ELEVATOR CALL BUTTON ASSEMBLY

[76] Inventors: George E. Miller, 161 Spruce St., Massapequa Park, N.Y. 11762; William J. Casey, 77 Fir St., Valley Stream, N.Y. 11580

[21] Appl. No.: 776,761

[22] Filed: Mar. 11, 1977

[51] Int. Cl.2 .......................... G06F 19/00; B66B 3/02

[52] U.S. Cl. .................................... 340/381; 200/314; 315/129; 315/136; 340/19 R; 340/332

[58] Field of Search ...................... 340/332, 19 R, 381; 187/29 R; 315/136, 129, 135; 200/313, 314, 317, DIG. 1

[56] References Cited

U.S. PATENT DOCUMENTS

| | | | |
|---|---|---|---|
| 2,738,489 | 3/1956 | Borden | 340/381 |
| 3,493,922 | 2/1970 | Laas | 340/19 R |
| 3,509,420 | 4/1970 | Ogle | 315/135 |
| 3,624,484 | 11/1971 | Colyer | 315/135 |
| 3,783,975 | 1/1974 | Lingegger | 187/29 R |
| 3,952,837 | 4/1976 | Rice | 187/29 R |
| 4,029,991 | 6/1977 | Schultz | 315/135 |

*Primary Examiner*—John W. Caldwell, Sr.
*Assistant Examiner*—James J. Groody
*Attorney, Agent, or Firm*—Bauer & Amer

[57] ABSTRACT

A direct replacement unit for an elevator touch button of the type which uses a voltage dropping gas tube. The replacement unit includes a series circuit, containing a relay coil, a zener diode, an indicator lamp, and a parallel circuit. The parallel circuit includes a normally open contact switch controlled by the relay coil and a mechanical call button.

4 Claims, 7 Drawing Figures

REPLACEMENT ELEVATOR CALL BUTTON ASSEMBLY

BACKGROUND OF THE INVENTION

This invention relates to an elevator call button assembly and more specifically to a replacement unit for an elevator touch button assembly.

In automatic elevator systems, each floor is provided with call buttons for summoning the elevator to the floor. In addition, there is generally provided a panel in the elevator which includes a series of call buttons utilized to provide a signal to control circuitry that the elevator should stop at a particular floor. The call buttons are generally identified by a floor designation which typically illuminates when selected by a passenger. Upon entry into the elevator, the passenger presses the desired call button identifying a particular floor on which he wants the elevator to stop. Typically, as soon as the call button is depressed, a light will go on, displaying the selected floor. The light can either be part of the call button itself, or can be provided on a separate panel.

In addition to the call button panel provided in the elevator, there is usually a master control panel provided for the main operator or starter. On the starter panels there are also provided call buttons which can control the stopping of the elevator at a particular floor. These also provide illumination either as part of the call button or in an auxiliary panel, indicating the floor on which the elevator will stop.

Many of the call buttons utilized are part of mechanical switches which remain closed once activated. The closing of the switch interconnects specific circuitry to provide the necessary signal to the control system so that the elevator will stop at the particular selected floor. Additionally, the closure of the switch also completes a circuit activating an illumination means to provide a display to the passengers on the elevator that the elevator will stop at the selected floor.

Other types of call button switch circuits utilize relay coils which are energized with current to provide holding power to the coil. However, the holding power is insufficient to bring the switch into a closed position. However, when the switch is manually closed by means of the call button, it is brought into close contact with the coil and the minimal current will be sufficient to maintain the switch in its closed position. To release the button, the coil circuit is opened disconnecting the coil and completely de-energizing it. Such type of energized coil control button is described in U.S. Pat. No. 2,738,489.

A more recent development for a call button is the electronic touch button unit. One such unit is provided by the Otis Elevator Company. The electronic touch button includes a proximity detector wherein the body of the passenger acts as an antenna. The touch button contains a gas tube in an enclosed glass envelope with the bulb exposed. The gas tube normally provides a voltage drop equal to the voltage of the nominal power supply, typically 135 volts. When the passenger comes into contact with the touch button, the voltage across the tube suddenly drops from the nominal power supply voltage to a reduced voltage, typically 72 volts. The sudden drop in voltage produces a pulse which actuates a remotely located electronic circuit to provide the information needed to have the elevator stop at the designated floor. Simultaneously, the touching of the button and the voltage drop ignites the gas tube to provide illumination of the touch button itself which gives the necessary display of the designated floor.

Because the conventional electronic touch button utilizes an exposed gas tube, it is very susceptible to breakage and vandalism. Frequently, the bulb is broken either purposely or inadvertently. For example, heaving or pushing against the button may damage and break the bulb. Many times, passengers with sharp objects, such as the tip of an umbrella, may poke against the touch button and completely shatter the bulb. Replacement of the electronic touch button is costly.

As a result, in many buildings, it is desired to replace the electronic touch button with a manual, tamper proof button system which is cheaper and not as susceptible to breakage and vandalism. However, existing call buttons are not of the type which can produce the equivalent voltage drop from the nominal power supply voltage to the desired reduced voltage, while maintaining a desired current through the button. Furthermore, existing call button circuits are not of the type which provide instantaneous closure of the switch and subsequent release thereof. As a result, in order to replace the electronic touch button, it would be necessary to completely remove all of the circuitry and replace the entire control system. Additionally, it would require mechanical changes to the elevator car entrance panels, the junction box, and would substantially modify the entire control system.

SUMMARY OF THE INVENTION

It is accordingly an object of the present invention to provide an improved electronic call button assembly which avoids the aforementioned problems of prior art devices.

Antoher object of the present invention is to provide an electronic call button assembly which can replace existing electronic touch button assemblies.

Yet another object of the present invention is to provide a direct replacement unit for an electronic touch button assembly of the type utilizing a voltage dropping gas tube.

Another object of the present invention is to provide a replacement unit for an electronic touch button, and especially of the electronic touch button provided by the Otis Elevator Company.

Still another object of the present invention is to provide a replacement for an elevator touch button assembly which does not require any major mechanical changes to the elevator panels, junction boxes or any major changes to the electronic control system of the elevator.

Another object of the present invention is to provide a simplified, reduced cost, electronic call button assembly which can be utilized in elevators.

Briefly, there is provided a direct replacement unit for an elevator touch button of the type utilizing a voltage dropping gas tube. The replacement unit includes a series circuit arrangement including a relay coil means, a first voltage dropping element, an indicator lamp means, and a parallel circuit. The parallel circuit includes a normally open contact switch means controlled by said relay coil means, and a call button means.

In an embodiment of the invention there is provided a second voltage dropping element placed in parallel across the relay coil means. Also, there is provided a third voltage dropping element placed in parallel across the indicator lamp means. A forward poled diode is also included in the series circuit relationship. The voltage dropping means utilized in an embodiment of the invention are zener diodes.

There is also provided an elevator call button assembly comprising a housing including the series circuit relationship as was aforedescribed.

The aforementioned objects, as well as other objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the Drawings

In the various figures of the drawing, like reference characters designate like parts.

DESCRIPTION OF THE PREFERRED EMBODIMENTS

Figure 1:
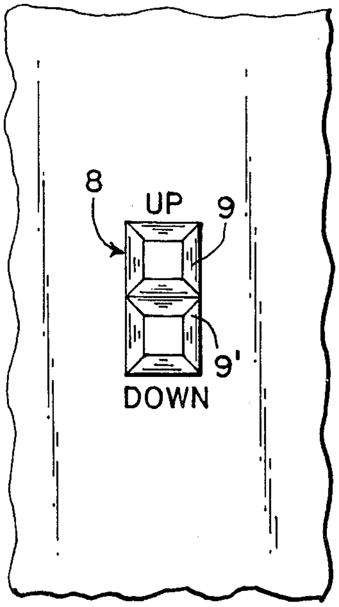
FIG. 1 is a front view of a section of an elevator shaft wall including a call button assembly of the electronic touch button type.
Figure 2:
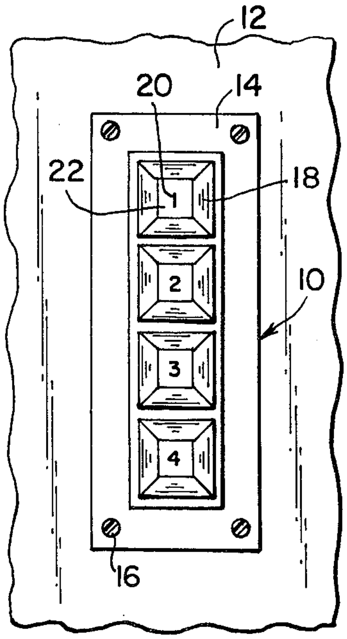
FIG. 2 is a front view of a section of an elevator wall, including a call button assembly of the electronic touch button type.

Referring now to FIG. 1 there is shown an elevator call button panel 8 having "up" and "down" buttons 9 and 9', respectively. In FIG. 2 there is shown elevator call button panel 10 mounted on a wall 12 of the elevator. Typically, it is mounted adjacent to the elevator door to be accessible upon entry into the elevator. Additionally, a similar type of panel can be located on the main floor and controlled by the elevator starter or main operator. The panel includes a faceplate 14 mounted onto the wall by fastening means such as screws 16. Contained on the panel are individual call buttons 18, each including a symbol 20 designating the floor being selected. Each call button 18 includes a glass front plate having a recessed center 22 to permit easy access by the passenger. The call button 18 is of the electronic touch button type which includes a proximity detector wherein the body of the passenger acts as the antenna. Within each call button 18 is contained a glass tube with the bulb thereof generally exposed. Because of the exposed bulb, and the glass covering, the electronic touch button is extremely susceptible to vandalism. It is also easy to break the glass covering the individual call buttons 18 and thereby completely damage that button and possibly disturb the complete electronic system.

Figure 3:
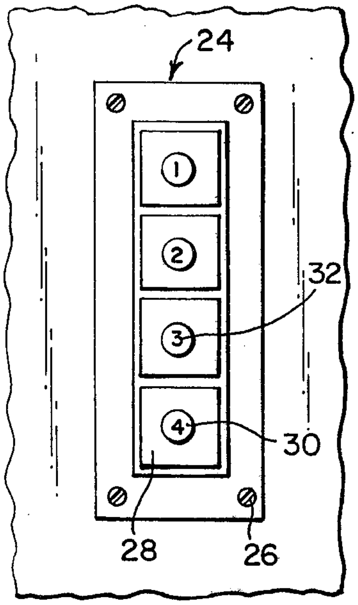
FIG. 3 shows the call button assembly of FIG. 2 replaced with the replacement unit of an embodiment of the present invention.

Referring now to FIG. 3 there is shown a replacement for the panel shown in FIG. 2. Similarly, the panel of FIG. 1 can be replaced. A new panel 24 is installed by means of the fastening means 26 directly into the screw holes and space available for the original unit. In the replacement unit, there are again provided individual call buttons 28, however, each of these includes a push button 30. The call buttons 18 contain indicia 32 designating the desired floor.

The plate and switches of FIG. 3 are of a size and shape which provide a direct replacement for the plate and switches of the touch button assembly, shown in FIG. 2, and therefore, do not require any mechanical changes to the elevator car entrance panels, the junction boxes, or the electronic control system. Likewise, a two-button assembly would be used for direct replacement of the unit of FIG. 1.

Figure 4:
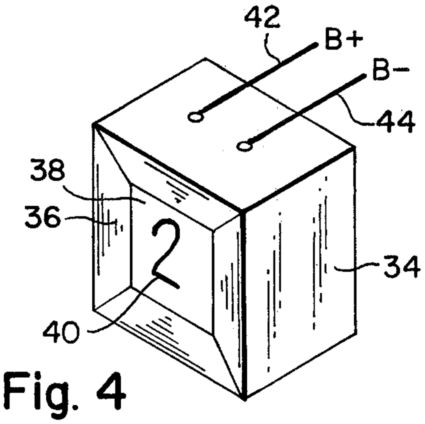
FIG. 4 shows a typical housing containing a single elevator call button of the electronic touch button type.
Figure 5:
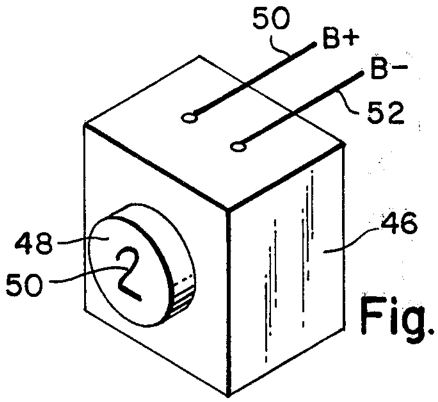
FIG. 5 shows a housing including a replacement unit of the present invention.

With reference to FIGS. 4 and 5, there will be shown an individual comparison of each call button replacement unit and original unit. In FIG. 4, a single call button is shown having a housing 34 which would be inserted within the panel of FIG. 2 and would serve as a touch call button for a designated floor. The front face includes the glass plate 36 with the centrally depressed portion 38 containing the designation 40 of a particular floor, as well as including the proximity detector. When the center portion 38 is touched, the entire front face illuminates. The circuitry in the housing will provide the necessary signal indicating to the main control system the particular floor on which the elevator should stop. Connected to the housing are shown the two wires 42, 44, respectively, connecting the particular electronic touch call button to the voltage source, shown as the B+ and B− terminals. Of course, instead of wires there could be simple contacts, or other means, to interconnect the voltage to the electronic circuitry contained within the housing 34.

Referring to FIG. 5, it will be noted that the housing 46 is of substantially identical size as the housing 34 of the touch button assembly. However, the touch button has been completely removed and is replaced by a housing which has a mechanical push button 48 on the front thereof. The button includes the designation 50 of a particular floor. The same B+ and B− terminals will be interconnected by means of the lines 50, 52. It will, therefore, be evident that there is provided a housing which can be a direct replacement for the electronic touch button shown in FIG. 4 by merely disconnecting the wires 42, 44 of the electronic touch button, removing the entire housing assembly 34 of the electronic touch button, and replacing it with the housing 46 of the call button of the present invention and interconnecting the wires 50, 52 of the new housing.

The electronic circuitry contained within the electronic touch button of FIG. 4 includes a gas tube 54 interconnected along the line 56 between a positive power supply line 58 and a negative power supply line 60. In operation, the gas tube sustains the voltage drop of the power supply, typically 135 volts. When the proximity detector is touched by the passenger, the gas tube 54 will ignite, suddenly dropping the voltage to approximately 72 volts. This drop in voltage will actuate a remotely located electronic circuit causing the elevator to stop at the designated floor. Simultaneously, the illumination of the bulb 54 will provide a display of the selected floor.

Figure 7:
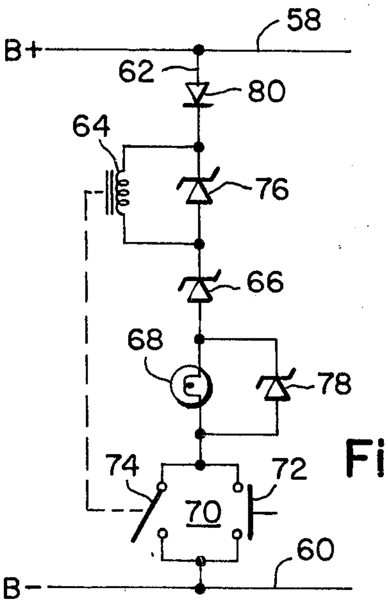
FIG. 7 shows a circuit diagram of the electronic call button of the present invention.

Referring now to FIG. 7, the circuit contained in the housing shown in FIG. 5 will now be described. The circuit includes a series circuit line 62 interconnected between the same power supply lines 58 and 60. In the series circuit line there is included a low resistance coil 64, a first voltage dropping element 66, an indicator bulb 68 and a parallel circuit 70. The parallel circuit includes a call button switch 72 and a contact switch 74 which is controlled by the relay coil 64.

A second voltage dropping means 76 is shown connected in parallel with the coil 64. Also, a third voltage dropping element 78 is shown connected in parallel across the indicator bulb 68. Additionally, a forward poled diode 80 is also shown interconnected in the series circuit 62.

In operation, when the call button 72 is depressed, current will flow through the coil 64 energizing it and causing the contact 74 to close. The call button 72 is a momentary closing type of button, whereby it will be automatically released following its initial actuation. However, even though the call button 72 will open, closing of the contact 74 will provide a self-holding action to the circuit and will maintain the current flowing through the circuit even though the call button 72 is opened. Current passing through the circuit will provide illumination of the bulb 68 to provide an indication of the selected floor. The bulb 68 can be placed directly in the mechanical call button 72 with the call button 72 being translucent to permit illumination of the call button. Alternatively, the bulb 68 could be placed elsewhere on a separate panel to provide the necessary display of the selected floor. Where the call buttons are used on a floor, the display is generally limited to show whether the call is for up or down.

Figure 6:
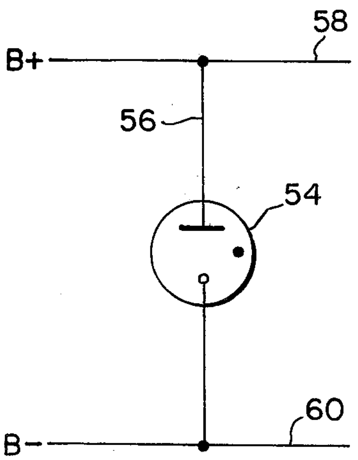
FIG. 6 shows a simplified circuit of the electronic touch button type utilizing the gas tube.

The voltage dropping means 66, 76 and 78 are shown as zener diodes. They are of substantially equivalent type and each provides a 24 volt drop to produce a total of a 72 volt drop. Initially, prior to the closing of the call button 72, the total voltage of the power source, and typically 135 volts, could be across the line. Upon depression of the call button, the line produces the sudden voltage drop to 72 volts. Accordingly, it will be noted that the electronic circuit of FIG. 7 provides a simulation of the same electrical condition provided by the gas tube of the electronic touch button shown in FIG. 6.

The diode 80 is provided to prevent burn out of the unit should it be inserted wrongly between the positive and negative terminals. The zener diode 76 provides both a voltage drop as well as providing a path for the pulse which will occur when the relay coil 64 is suddenly opened. The zener diode 78 serves to complete the circuit should the indicator bulb 68 not operate.

In utilizing the electronic touch button, in order to de-energize the electronic gas tube, a reverse voltage is applied. Typically, a 125 volt half wave positive pulse from a remote control system is applied from the negative line 60. This will de-energize the gas tube. In a similar manner, such a pulse from the negative line 60 will also serve to de-energize the circuit of the present invention and will cause the coil to become deactivated, thereby releasing the contact switch 74 and permitting the higher voltage of 135 volts to be placed across the entire circuit.

It will, therefore, be appreciated that the circuit of the present invention provides a voltage drop from a first high voltage to a second lower voltage, while maintaining a selected current of desired value through the circuit. Additionally, it provides energization through a call button, typically, a mechanical type momentary closing push button switch. It, therefore, provides a much sturdier type of elevator call button assembly which can withstand abuse, is versatile, is reduced in cost and is substantially tamper proof. Furthermore, both mechanically and electrically, it provides a complete replacement unit for the electronic touch button type of call button assembly, and typically of the type provided by the Otis Elevator Company.

Although the invention has been described as a replacement unit, it will also be appreciated that it can be initially installed as a reduced cost, and efficient, elevator call button assembly, without necessarily replacing an existing touch button system.

There has been disclosed heretofore the best embodiment of the invention presently contemplated. However, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In an elevator operating circuit including a source of D.C. electrical potential at a first voltage, a pair of conductors upon which the electrical potential is normally impressed, and a touch-actuated gas tube connected across the conductor pair for producing a selected drop in the electrical potential therebetween to a predetermined second voltage when the gas tube is actuated so as to summon the elevator to a selected location and for maintaining the selected potential drop throughout an operating cycle of the elevator until the gas tube is subsequently deactivated by impressing a reverse polarity electrical potential upon at least one of the conductor pair at the termination of the operating cycle, a replacement unit for simulating the electrical operation of the gas tube and comprising, in series electrical connection across the pair of conductors:

relay coil means energized upon actuation of said replacement unit and for enabling continued actuation thereof to the termination of the elevator operating cycle, lamp means for indicating an actuated condition of said replacement unit, zener diode means for providing a voltage drop between the pair of conductors when said replacement unit is actuated, and a parallel circuit comprising a normally open call button switch means for momentary closure to initially actuate said replacement unit by completing a series electrical connection including said zener diode means across the pair of conductors to provide the selected voltage drop therebetween, and normally open holding switch means operably associated with and for closure by said relay coil means for maintaining said completed series electrical connection when said call button means is opened after momentary closure thereof and throughout the remainder of the elevator operating cycle, whereby said replacement unit is deactivated at the termination of the elevator operating cycle by impressing a reverse polarity electrical potential upon at least one of the pair of conductors to de-energize said relay coil means, thereby opening said holding switch means to open said completed series electrical connection and enabling the electrical potential to risingly return from the second to the first voltage.

2. The replacement unit of claim 1 and further comprising a second zener diode means in parallel electrical connection directly across said relay coil means to provide a fixed voltage drop thereacross.

3. The replacement unit of claim 2 and further comprising a third zener diode means in parallel electrical connection directly across said indicator lamp means to provide an alternate current path in the event of failure of said lamp means.

4. The replacement unit of claim 3 and further comprising forward poled diode means in the series electrical connection for protecting said replacement unit against accidental reverse polarity electrical connection.

* * * * *